United States Patent [19]

Friedman et al.

[11] Patent Number: 5,075,883

[45] Date of Patent: Dec. 24, 1991

[54] ANALOG AND ANALYTICAL COMPUTATION METHOD FOR DETERMINING DETECTOR MTF

[75] Inventors: Melvin H. Friedman; Max L. Harwell, both of Alexandria, Va.

[73] Assignee: The United States of America as represented by the Secretary of the Army, Washington, D.C.

[21] Appl. No.: 637,050

[22] Filed: Jan. 3, 1991

[51] Int. Cl.$^5$ .............................................. G01M 11/00
[52] U.S. Cl. .................................... 364/553; 364/524; 356/124.5
[58] Field of Search ............... 364/556, 553, 524, 525; 350/162.11; 356/124.5; 250/330, 332, 341

[56] References Cited

U.S. PATENT DOCUMENTS 3,549,240 12/1970 Sawatari ........................... 356/124.5
3,938,892 7/1976 Klingman, III .................. 356/124.5

OTHER PUBLICATIONS

"Measurment of Two-Dimensional Optical System Modulation Transfer Function (MTF) by Computation of Second Order Speckle Statistics", Lund & Azuit SPIE, vol. 192 Interferometry 1979, pp. 166–173.

Primary Examiner—Parshotham S. Lall
Assistant Examiner—S. A. Melnick
Attorney, Agent, or Firm—Milton W. Lee; Anthony T. Lane

[57] ABSTRACT

An analog computer method provides modulation transfer functions (MTF) expressions or graphs for arbitrary shaped detectors in an arbitrary scan direction. Fraunhofer diffraction calculations or measurements given for specific shaped apertures are used for calculating detector MTFs of similarly shaped detectors. In an analog measuring device, an aperture in an opaque screen may be made the shape of a detector whose MTF is to be calculated. The aperture is flooded with laser light which produces a Fraunhofer irradiance pattern at an observing screen which is parallel with the opaque screen, for measuring the irradiance in the Fraunhofer plane at the observing screen. A sensor, which has a detector small compared with the diffraction pattern, is moved along the chosen thermal imager scan direction, in the Fraunhofer plane. The analog pattern of the irradiance along the x'-axis is digitized by a digitizer, has the square root of the irradiance versus distance along the x'-axis plotted and normalized so that at x'=0 the square root of the irradiance equals one (1). By relabeling the square root of the irradiance with MTF and relabeling the x'-axis with spatial frequency a detector MTF curve is shown in appropriate units of spatial frequency.

8 Claims, 2 Drawing Sheets

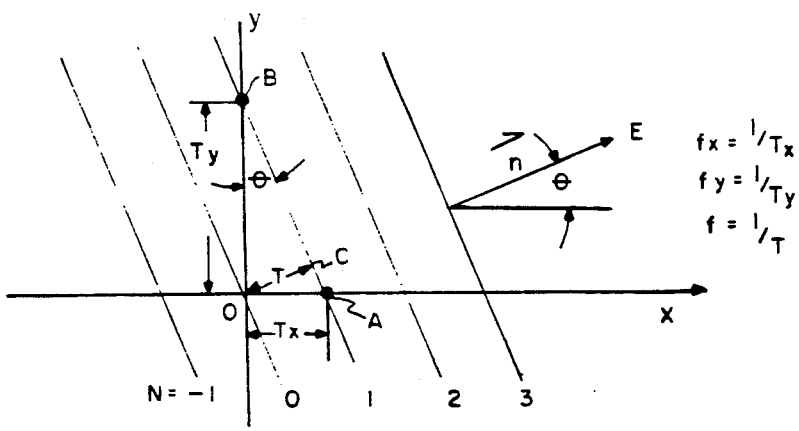
FIG. 1
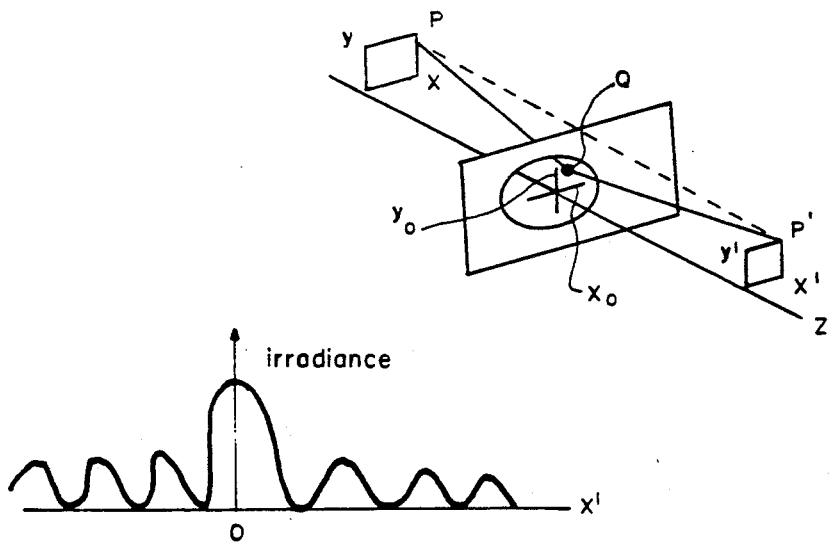
FIG. 2
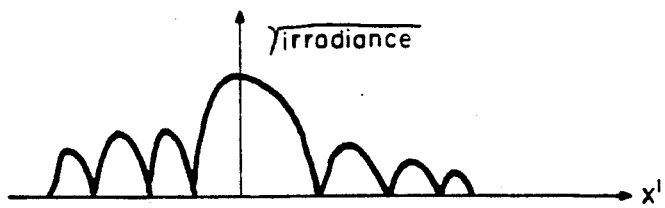
FIG. 4
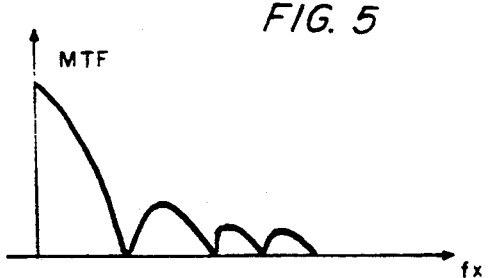
FIG. 5
FIG. 6

ANALOG AND ANALYTICAL COMPUTATION METHOD FOR DETERMINING DETECTOR MTF

The invention described herein may be manufactured, used, and licensed by the U.S. Government for governmental purposes without the payment of any royalties thereon.

BACKGROUND OF INVENTION

1. Field

The present invention is comprised of an analog computer method which calculates modulation transfer functions (MTFs) of various detector shapes as a function of detector orientation with respect to the in-scan direction of a scanning thermal image system, and is specifically an analog method based on the observation that the mathematics of Fraunhofer diffraction is related to the problem of computing detector MTFs.

2. Prior Art

No prior art is known for calculating detector MTFs for arbitrary shaped detectors which are scanned in an arbitrary direction. An MTF expression was developed for an arbitrary shaped detector with the in-scan direction along the x-axis in a co-pending U.S. patent application Ser. No. 07/637,045 filed 1/08/91 by the present co-inventors, entitled "Development of General Modulation Transfer Function". The present invention is involved in a MTF expression for an arbitrary shaped detector scanned at an arbitrary angle from the x-axis.

Finding the limits of integration for an arbitrary shaped detector for all detector orientations, with respect to the scan direction, can become complicated. Thus, a need exists to compute detector MTF for arbitrary shape detector for arbitrary in-scan direction.

SUMMARY OF THE INVENTION

The present invention may be used to choose a particular detector for thermal imager systems in accordance with known or given requirements for viewing particular scenes. Some of these factors are determined by input signal strength, sampling rate of the focal plane, and scene spatial frequency content viewed by the detector.

The invention was conceived by the progression of finding a MTF expression for an arbitrary shaped detector in which the in-scan direction makes an arbitrary angle $\theta$ with respect to the x-axis and then verifying that detector MTF is equal to the modulus of the two-dimensional Fourier transform of the detector responsivity function $R(x,y)$ to discover that the present analog computer can be used to provide the MTF expression for various shaped detectors scanned in an off x-axis scan direction. Standard Fraunhofer pattern calculations, which exist in published literature, were looked at and it was hypothesized that these Fraunhofer patterns were related to detector MTFs. It was then proven that computing Fraunhofer diffraction patterns is mathematically similar to computing detector MTFs to show that the present analog computer can be used to compute detector MTFs.

The analog computer method uses an apparatus comprised of a laser, collimating optics for collimating the laser output beam, an opaque screen with an arbitrary shaped aperture which is flooded with the collimated light, an observing plane at an appropriate Fraunhofer diffraction distance so that the Fraunhofer diffracted irradiance incident on the observing plane from the opaque screen is measured along a thermal imager scan-direction x'-axis on the observing plane. A sensor means is moved along the x'-axis to sense the analog pattern of the irradiance. The irradiance pattern is digitized, has the square root of the irradiance versus distance along the x'-axis plotted and normalized so that at $x'=0$ ($x'=0$ is the Fraunhofer diffraction pattern center of symmetry) the square root of the irradiance equals 1. By simply relabeling the square root of the normalized irradiance as the detector MTF and the x'-axis distance by the spatial frequency, a detector MTF curve is computed in units of spatial frequency wherein the detector shape is the equivalent of the aperture shape.

Alternatively, the same apparatus is used to determine detector MTFs from known Fraunhofer diffraction intensity pattern formulae calculations in the x'-y' axis for each of a plurality of specific aperture shapes. The intensity pattern formulae along the x'-axis is taken from calculations in the literature, normalized to one at $x'=0$ and its square root plotted versus distance along the x'-axis in a manner similar to that of the analog computer described above to find the detector MTF along the in-scan direction of the thermal imager. This method is indirect because it relies on a plethora of Fraunhofer diffraction calculations which have previously been done for a purpose other than for determining detector MTFs.

The analog computer and analytical computation methods for finding detector MTFs have advantages and disadvantages. The analog computer method has the advantage that it can be applied to any detector for which a transmission function can be experimentally generated which matches the responsivity of the detector. For many detectors this simply involves cutting a hole in an opaque sheet with the same shape as that of the detector, measuring the intensity on an opaque screen and straight forward mathematical manipulation of the results to get the desired MTF function. The analytical computation method has the disadvantage that it is limited to aperture shapes for which Fraunhofer calculations have been done and has the advantage of not requiring a measurement so it does not suffer from measurement errors.

In the present invention, analytical algorithms are presented after it is shown mathematically that the detector MTFs are related to both the Fraunhofer diffraction patterns and two-dimensional Fourier transforms.

BRIEF DESCRIPTION OF THE DRAWINGS

FIG. 1 illustrates curves of constant phase in the x-y plane in which the scan angle is normal to the curves;

FIG. 2 illustrates geometrical coordinates in object space (unprimed coordinates), in aperture space (zero subscript) and after light wave diffraction through an aperture (primed coordinates);

FIG. 4 illustrates irradiance incident on an observing plane in the x'-axis measured as a voltage;

FIG. 5 illustrates the plot of the square root of the voltage or current signal versus the distance along the x'-axis;

FIG. 6 illustrates the MTF versus spatial frequency; and

DETAILED DESCRIPTION OF THE PREFERRED EMBODIMENT

Figure 3:
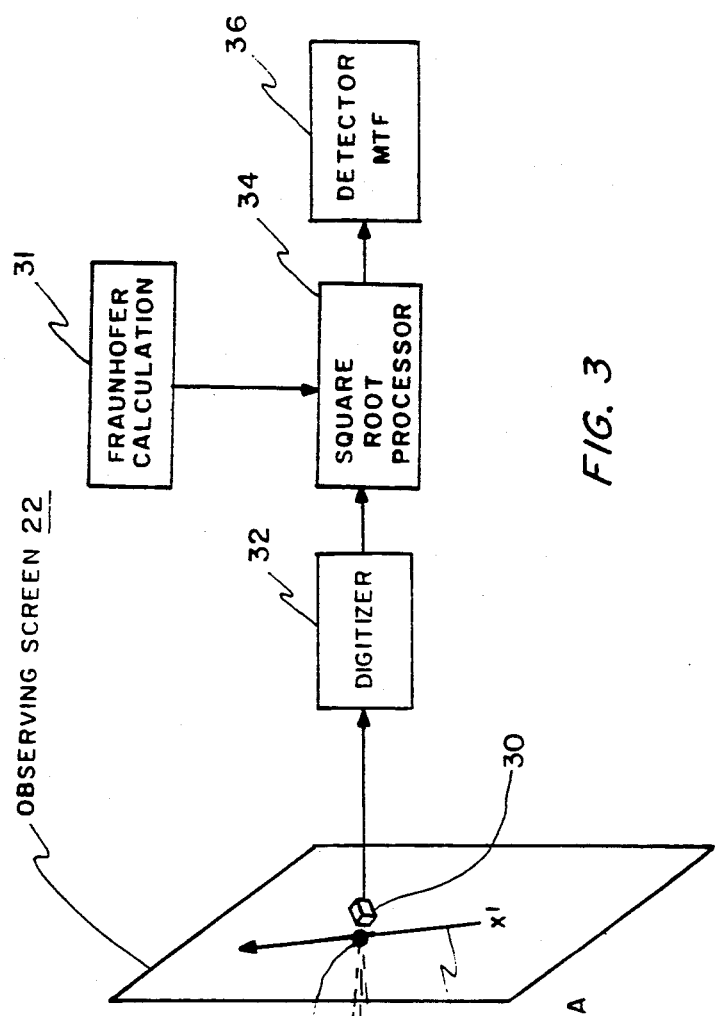
FIG. 3 illustrates an apparatus used in the analog computer method of measuring detector MTFs and also illustrates the analytical or indirect method for finding detector MTFs.
Figure 7:
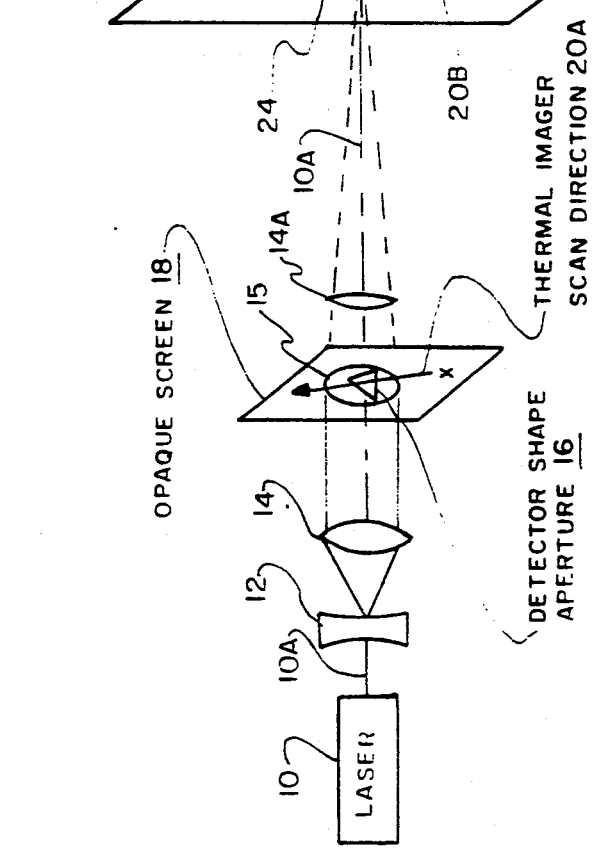
FIG. 7 is illustrative of the geometry between the opaque and observing screens in FIG. 3 if the Fraunhofer diffraction pattern is observed without benefit of the converging lens 14A.
Figure 7:
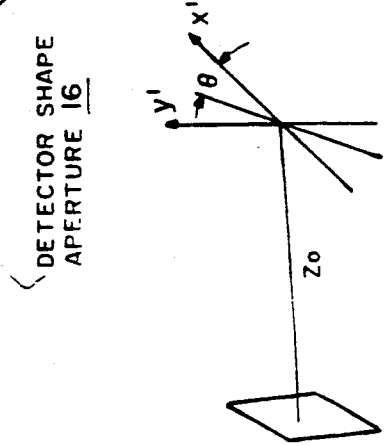

Refer to FIG. 1 for the explanation of the analytical computation method wherein a generalized detector MTF equation is developed where the scan direction makes an angle $\theta$ with respect to the x-axis of the detector. The detector MTF is computed by irradiating the detector with radiation E which moves in direction n, has modulation m and a spatial frequency f in direction n as $$E(x,y,\phi; f_x, f_y, m) = E_0[1 + m \sin(2\pi f_x x + 2\pi f_y y + \phi)] \quad \text{Eq. (1a)}$$

with $0 < m < 1$.

The locus of points in Equation 1a where $E = E_o$ may be obtained by setting the sin function equal to $2\pi N$ rather than $\pi N$, where N is an integer, because the locus of points are to be separated by a wavelength rather than half a wavelength. That is, the waves of constant phase are defined by $$2\pi f_x x + 2\pi f_y y + \phi = 2\pi N \quad \text{Eq. (2a)}$$

The $\phi$, i.e. the phase angle, is set equal to zero and the family of waves is drawn for $N = -1, 0, 1, 2, 3$. The spatial periods T, $T_x$ and $T_y$ are as shown in FIG. 1 wherein $f_x$ and $f_y$ are identified as the reciprocal of the spatial periods for curves of constant phase. Angle $\theta$ is the direction of a vector normal to the waves of constant phase. Rewrite Equation 2a for the case where $\phi = 0$ and $N = 1$ results in $$f_x x + f_y y = 1 \quad \text{Eq. (2b)}$$

The slope of the curves defined by Equation 2a is $f_x / -f_y$, which implies a vector t tangent to the lines of constant phase is given by $$t = -i f_y + j f_x \quad \text{Eq. (3)}$$

where $\hat{i}$ and $\hat{j}$ are unit vectors in the x and y directions. Thus a normal vector n is given by $$n = i f_x + j f_y \quad \text{Eq. (4)}$$

In terms of the angle $\theta$, $$\tan \theta = \frac{f_y}{f_x} \text{ or } \theta = \tan^{-1} f_y / f_x \quad \text{Eq. (5)}$$

As $\phi$ changes, the waves of constant phase move in direction n, since from Equation 2a as $\phi$ changes the waves of x and y change but the slopes remain constant.

Now relate the spatial frequency f in the direction n to $f_x$ and $f_y$. Because f is defined as the frequency in the direction of n, the line OC is parallel to n. From triangle OBC and OCA $$\sin \theta = T/T_y \quad \text{Eq. (6a)}$$

$$\cos \theta = T/T_x \quad \text{Eq. (6b)}$$

Squaring and adding these equations $$(T/T_x)^2 + (T/T_y)^2 = 1 \quad \text{Eq. (6c)}$$

By defining the spatial frequency f in the direction n as $1/T$ Equation 6c becomes $$f_x^2 + f_y^2 = f^2 \quad \text{Eq. (7)}.$$

It is thus shown that Equation 1 represents a wave with modulation m, spatial frequency f which moves in the direction n. The vector n and direction of n are related to $f_x$ and $f_y$ by Equations 4 and 5 while f is related to $f_x$ and $f_y$ by Equation 7.

Equation 1a should be defined directly in terms of f and $\theta$ rather than $f_x$ and $f_y$ for the purpose of computing detector MTF. Equations 6a and 6b are rewritten as $$\sin \theta = f_y/f \quad \text{Eq. (6aa)}$$

$$\cos \theta = f_x/f \quad \text{Eq. (6bb)}$$

Equation 1a becomes $$E(x,y,\phi; f,\theta,m) = E0[1 + m \sin(2\pi f \cos(\theta) x + 2\pi f \sin(\theta) y + \phi)]. \quad \text{Eq. (1b)}$$

Rather than repeatedly write factors of $2\pi$, symbols $K_x$, $K_y$ and K are defined by $$K_x = 2\pi f_x \quad \text{Eq. (7a)}$$

$$K_y = 2\pi f_y \quad \text{Eq. (7b)}$$

$$K = 2\pi f \quad \text{Eq. (7c)}$$

The voltage signal V out of the detector when irradiated by $E(x,y,\phi;f,\theta,m)$ is $$V(\phi;f,\theta,m) = \int\int E(x,y,\phi;f,\theta,m) R(x,y) \, dx \, dy \quad \text{Eq. (8)}$$

Throughout this patent application, integrals without limits are understood to indicate integration over the entire x-y plane. Now define A, $S(K,\theta)$, $C(K,\theta)$ by equations $$A = \int\int R(x,y) \, dx \, dy \quad \text{Eq. (9a)}$$

$$S(K,\theta) = A^{-1} \int\int R(x,y) \sin[K \cos(\theta) x + K \sin(\theta) y] \, dx \, dy \quad \text{Eq. (9b)}$$

$$C(K,\theta) = A^{-1} \int\int R(x,y) \cos[K \cos(\theta) x + K \sin(\theta) y] \, dx \, dy \quad \text{Eq. (9c)}$$

The resulting analytical method of computing detector MTF for a detector oriented at a angle with respect to the scan direction is $$MTF(K,\theta) = [C^2(K,\theta) + S^2(K,\theta)]^{\frac{1}{2}} \quad \text{Eq. (10)}$$

To make the connection with the Fourier transform, it is convenient to express the MTF in terms of $K_x$ and $K_y$. The equations analogous to Equations 9a, 9b, 9c and 10 are $$A = \int\int R(x,y) \, dx \, dy \quad \text{Eq. (11a)}$$

$$S(K_x, K_y) = A^{-1} \int\int R(x,y) \sin(K_x x + K_y y) \, dx \, dy \quad \text{Eq. (11b)}$$

$$C(K_x, K_y) = A^{-1} \int\int R(x,y) \cos(K_x x + K_y y) \, dx \, dy \quad \text{Eq. (11c)}$$

$$MTF(K_x, K_y) = [C^2(K_x, K_y) + S^2(K_x, K_y)]^{\frac{1}{2}} \quad \text{Eq. (11d)}$$

A relationship between detector MTF and two dimensional Fourier transforms will now be shown. The two dimensional Fourier transform for a function $R(x,y)$ is defined by $$F[R(x,y)] = \int\int R(x,y) \exp[-j2\pi(f_x x + f_y y)] \, dx\, dy \quad \text{Eq. (12a)}$$

As shown for Equations 7a–c, use the abbreviated notation $K_x$ and $K_y$ to avoid repeated use of $2\pi$ resulting in $$\begin{aligned} F[R(x,y)] &= \int\int R(x,y)\exp[-j(K_x x + K_y y)] dx\, dy \quad \text{Eq. (12b)} \\ &= \int\int R(x,y)\cos(K_x x + K_y y) dx\, dy \\ &\quad - j\int\int R(x,y)\sin(K_x x + K_y y) dx\, dy \end{aligned}$$

Now, using the notation of Equations 11a–c, Equation 12b becomes $$F[R(x,y)] = A[C(K_x,K_y) - jS(K_x,K_y)] \quad \text{Eq. (12c)}$$

The modulus of $F[R(x,y)]$ is given by $$|F[R(x,y)]| = A[C^2(K_x,K_y) + S^2(K_x,K_y)]^{\frac{1}{2}} \quad \text{Eq. (12d)}$$

Dividing both sides of Equation 12d by A results in $$\begin{aligned} A^{-1}|F[R(x,y)]| &= [C^2(K_x, K_y) + S^2(K_x, K_y)]^{\frac{1}{2}} \quad \text{Eq. (12e)} \\ &= MTF(K_x, K_y) \end{aligned}$$

Equation 12e is an important result in that it gives the relationship between the Fourier transform of the $R(x,y)$ function, i.e. the detector responsivity as a function of position, and the detector MTF. Equation 12 shows that aside from the normalization constant A, the detector MTF is equal to the modulus of the two-dimensional Fourier transform of the detector responsivity function $R(x,y)$. The detector responsivity $R(x,y)$ could be measured by detector manufacturers. Then the detector modulation transform function could be calculated using equation 12e.

After verifying the relationship between the Fourier transform of R function and the detector MTF, examination of standard Fraunhofer patterns (such as that from a rectangular slit) revealed that Fraunhofer diffraction patterns and detector MTF functions were closely related. In particular, if Fraunhofer aperture has transmission function $T(x,y)$ equal to detector responsivity function $R(x,y)$ then the Fraunhofer diffraction intensity pattern can be mathematically operated on to yield the detector MTF function. This will now be shown.

Refer to FIG. 2 for a discussion of the Fraunhofer diffraction theory as related to Fourier transforms. This material is discussed in a book (p. 102) titled *Optics: A Short Course for Engineers* (1984) by Williams and Becklund. In FIG. 2, the coordinates $x_0, y_0$ refer to the coordinates of the aperture while $x', y'$ refer to coordinates of a distant plane parallel to the aperture. A complex spatial disturbance U at point P' is given by $$U(P') = C \iint_{\text{Aperture}} \exp[2\pi j(f_x x_0 + f_y y_0)] \, dx_0\, dy_0 \quad \text{Eq. (13)}$$

where disturbance $U(P')$, aside from a complex constant C, is the Fourier transform of the aperture and where $f_x$ and $f_y$ are given by $$f_x = \frac{x'}{\lambda z_0} \quad \text{Eq. (14a)}$$

$$f_y = \frac{y'}{\lambda z_0} \quad \text{Eq. (14b)}$$

In Equations 14a and 14b, $\lambda$ is the wavelength of the incident radiation and $z_0$ is the distance from the center of the aperture to the distant plane in which the Fraunhofer diffraction pattern is observed.

If the transmission across the aperture is described by function $T(x_0,y_0)$, Equation 13 becomes $$U(P') = C\iint T(x_0,y_0) \exp[2\pi j(f_x x_0 + f_y y_0)] \quad \text{Eq. (15a)}$$

As before, integrals without limits are taken to be over the entire $x_0$-$y_0$ plane. $T(x_0,y_0)$ is zero outside the aperture, so the only contributions to the integral come from the aperture. Using the $K_x$, $K_y$ notation defined by Equations 7a–c, Equation 15a becomes $$\begin{aligned} U(P') &= C\iint T(x_o, y_o)\exp[j(K_x x_o + K_y y_o)] dx_o\, dy_o \quad \text{Eq. (15b)} \\ &= C\iint T(x_o, y_o)\cos(K_x x_o + K_y y_o) dx_o\, dy_o \quad \text{Eq. (15c)} \\ &\quad + j\iint T(x_o, y_o)\sin(K_x x_o + K_y y_o) dx_o\, dy_o \end{aligned}$$

Now define real numbers $C_d$ and $S_d$ which depend on $K_x$ and $K_y$ by $$C_d(K_x,K_y) = \iint T(x_0,y_0) \cos(K_x x_0 + K_y y_0) \, dx_0\, dy_0 \quad \text{Eq. (16a)}$$

$$S_d(K_x,K_y) = \iint T(x_0,y_0) \sin(K_x x_0 + K_y y_0) \, dx_0\, dy_0 \quad \text{Eq. (16b)}$$

Using Equations 16a–b, Equations 15c is expressed by $$U(P') = C[C_d(K_x,K_y) + j S_d(K_x,K_y)] \quad \text{Eq. (17)}$$

Since the irradiance E at point P' is the modulus of $U(P')$ squared $$E = |C|^2[C_d^2(K_x,K_y) + S_d^2(K_x,K_y)] \quad \text{Eq. (18)}$$

By comparing Equations 16a–b and 18 with Equations 11a–c, it is concluded that computing Fraunhofer diffraction patterns is mathematically similar to computing detector MTF functions, in the sense that the two dimensional integrals have the same form in both cases. These similarities are:

(1) the transmission $T(x_0,y_0)$ is analogous to the detector responsivity function $R(x,y)$, (2) Fraunhofer diffraction integrals are done over the aperture while detector MTF calculations are done over the detector, (3) $C_d(K_x,K_y)$ and $S_d(K_x,K_y)$ in the diffraction problem are analogous to $C(K_x,K_y)$ and $S(K_x,K_y)$ in the detector MTF problem and (4) the symbols $f_x$ and $f_y$ of Equations 14a–b were fortuitously chosen to match $f_x$ and $f_y$ in Equations 1a through 11d. (Note that $f_x$ and $f_y$ in Equations 1a through 11d are dimensionally equal to spatial frequencies but that $f_x$ and $f_y$ in equations 14a–b are measures of the distance away from the z-axis in FIG. 2.)

Some differences which exist between detector MTF and Fraunhofer diffraction are:

(1) the real constant $|C|^2$ is not an analog of the real constant A in Equation 11a and (Note that A has the property that it makes the detector MTF equal to one at zero spatial frequency while the constant $|C|^2$ measures the irradiance at the aperture and how far away the Fraunhofer plane is from the aperture.)

(2) the square bracket in Equation 18 is raised to the first power while the square bracket in Equation 11d is raised to the ½ power.

The above observations suggest that an algorithm can be developed for converting Fraunhofer diffractions formulae into detector MTF formulae and that an apparatus used for measuring Fraunhofer diffraction patterns can be easily converted into an analog computer for computing detector MTFs. The analog computer method will be explained herein below with reference to FIG. 3.

The method of using an analytical algorithm for converting Fraunhofer diffraction formulae into detector MTFs will first be discussed. This method is convenient when a Fraunhofer diffraction formula has been computed for a geometry and transmission which matches the detector geometry and responsivity.

Equations 14a and 14b are used to express the Fraunhofer diffraction formula in terms of $f_x$ and $f_y$. Let $\theta$ denote the scan direction with respect to the x-axis, i.e. $\theta=0$ denotes a scan direction along the x-axis. Use the relationships of Equations 5, (6aa), (6bb) and 7 to express the Fraunhofer diffraction formula in terms of f only, i.e. if $\theta=0$ set $f_y=0$ and $f_x=f$ in the Fraunhofer diffraction formula. Then, to get the detector MTF take the square root of the Fraunhofer irradiance expression (compare Equations 18 and 10) and normalize the expression so that the MTF at zero spatial frequency is one (1). Then answer is expressed in terms of f and since by convention $f_x$ is the scan direction, replace f by $f_x$. This method may be called the indirect method because a calculation originally done to calculate a Fraunhofer diffraction is utilized to calculate a detector MTF result.

An example of the method is presented for the diamond shaped detector. However, this algorithm may be used to compute detector MTFs for other shaped detectors.

For the diamond detector $R(x,y)=R_0$ inside the detector and $R(x,y)=0$ outside. The Fraunhofer diffraction irradiance for a square aperture is given in a book entitled *Optics* by Hecht and Zajac (1974) on page 349 as $$I(x'y') = I_o \left[ \frac{\sin \alpha'}{\alpha'} \right]^2 \left[ \frac{\sin \beta'}{\beta'} \right]^2 \qquad \text{Eq. (19)}$$

wherein $\alpha' = \frac{\pi a x'}{\lambda_{zo}} = \pi f_x a$, and $\beta' = \frac{\pi a y'}{\lambda_{zo}} = \pi f_y a$.

The Fraunhofer diffraction intensity is $$I(f_x, f_y) = I_o \left[ \frac{\sin \pi f_x a}{\pi f_x a} \right]^2 \left[ \frac{\sin \pi f_y a}{\pi f_y a} \right]^2 . \qquad \text{Eq. (20)}$$

I(f) is the quantity wanted. Equation (20) may be expressed in terms of f by using (6aa) and (6bb) evaluated at $\theta=45°$ $f_x = f \cos \theta \frac{f}{2^{\frac{1}{2}}}$ and $f_y = f \sin \theta \frac{f}{2^{\frac{1}{2}}}$ to yield $$I(f) = I_o \left[ \frac{\sin \frac{\pi f a}{2^{\frac{1}{2}}}}{\frac{\pi f a}{2^{\frac{1}{2}}}} \right]^4 \qquad \text{Eq. (21)}$$

The detector MTF is $$MTF(f) = \frac{[I(f)]^{\frac{1}{2}}}{I_o} = \frac{I_o}{I_o} \left[ \frac{\sin \frac{\pi f a}{2^{\frac{1}{2}}}}{\frac{\pi f a}{2^{\frac{1}{2}}}} \right]^2 \qquad \text{Eq. (22)}$$

Equation (22) is the desired result for the diamond shaped detector. A similar procedure can be to convert Fraunhofer diffraction intensity analytical results for any aperture into detector MTFs along a specified scan direction.

Refer now to FIG. 3 for a detailed description of the analog apparatus involved in the analog computer method and the analytical method of using experimentally measured Fraunhofer diffraction intensity patterns or formulae for determining detector MTFs. Light from a laser 10 may be passed through an optical means, comprised of diverging lens 12 and converging lens 14 to form a collimated beam, whose cross sectional area is generally in the shape of a circle, which impinges on an opaque sheet 18. An aperture 16, in the geometrical shape of a detector whose MTF is to be computed, is cut out of sheet 18. Sheet 18 is perpendicular to laser propogation direction 10A. Line 20A is drawn on opaque screen 18 in the scan direction of the thermal imager. The aperture 16 is shown as a triangle, but can be any geometrical shape. Different aperture configurations will have diffraction patterns with centers of symmetry as shown in *The New Physical Optics Notebook: Tutorials in Fourier Optics* by Reynolds, DeVelis, Parrent, Thompson (SPIE Optical Engineering Press (1989), p. 20). An observing plane 22 is positioned parallel to 18 and is placed far enough from 18 so that the Fraunhofer conditions hold. If the distance is so far as to be inconvenient, then a converging lens 14A may be placed near 18 and 22 will be a distance f away from lens 14A.

The pattern seen or detected by detector 30 on plane 22 can be used to compute the detector MTF. The pattern on the screen will have a center of symmetry indicated at point 24. Now draw a line 20B parallel to line 20A which passes through this center of symmetry 24. Take 20A to be the x-axis (thermal imager scan direction) and 20B to be the x'-axis. Now move a sensor means 30, such a small photo-voltaic detector (small compared to spatial variation distance of the Fraunhofer diffraction pattern) along the x'-axis. The voltage is plotted and digitized by digitizer 32 and is illustrated by FIG. 4. The square root of the digitized voltage versus distance along the x'-axis is plotted and normalized in a square root processor 34 so that at the point x'=0 the square root of the voltage is 1. FIG. 5 illustrates the square root voltage. FIG. 6 illustrates dropping the negative portion of the x'-axis and relabeling voltage axis with the MTF label and the distance along the x'-axis with spatial frequency $f_x$ label. By using the signals from 34, the detector MTF is determined as shown be block 36 of FIG. 3 and as illustrated in FIG. 6. Knowing the shape of the MTF curve in arbitrary units of $f_x$ is sometimes adequate. If definite units for $f_x$ are needed then the units of $f_x$ will be given in cycles per centimeter if $f_x$ is computed using $$f_x = \frac{x'}{\lambda z_o} \qquad \text{Eq. (23)}$$

where x'=distance along x'-axis measured in centimeters;
λ=laser wavelength in centimeters;
$z_0$=separation between 14A and 22 in centimeters if converging lens 14A is used;
$z_0$=separation between 15 and 22 in centimeters if converging lens 14A is not used.

In the above analog method, by placing the x-axis in an arbitrary direction, the MTF can be found for an arbitrary scan direction with respect to the detector. Adjusting the transmission across aperture 16 allows the analog computer to compute MTF where the responsivity is an arbitrary function of position. It should be noted that the light which illuminates aperture 16 may be chosen in the visible, infrared, or microwave spectrums and can be chosen at the experimenters convenience. Larger wavelengths enable the Fraunhofer diffraction pattern to be seen with a larger aperture in the opaque screen and ease the requirement that the sensor 30 have spatial extent small compared to spatial variations in the Fraunhofer diffraction pattern.

Refer to FIG. 3 again for a description of the analytical method, with specific reference to the above explained Fraunhofer diffraction formulae for a diamond shaped aperture for conversion into the MTF of a similarly shaped detector. Equation 19 which is the analytical formulae for Fraunhofer diffraction is represented by block 31 in FIG. 3. Thus, in FIG. 3, an experimentally measured Fraunhofer diffraction pattern which is an output of block 32 or an analytical Fraunhofer diffraction formulae is an output of block 31 are inputs to blocks 34 and 36 which produce the desired MTF result.

We claim:

1. A method for determining detector modulation transfer functions of arbitrary shape detectors scanned in an arbitrary in-scan direction, the steps of said method comprising:

providing an arbitrary shaped detector in an x-y plane coordinate system wherein R(x,y) denotes detector responsivity as a function of position;

maintaining the orientation of said detector fixed relative to said x-y plane wherein said arbitrary in-scan direction is at an arbitrary angle θ with respect to the x-axis of said x-y plane;

irradiating said detector with radiation E of a selected wavelength along an angle θ in which E moves in a direction n, and a spatial frequency f in said direction n;

generating an expression for the voltage signal V out of said detector when said radiation E moves along angle θ in direction n;

expressing a modulation transfer function for the detector in a form to establish the relationship to the two-dimensional Fourier transform of the R(x,y) function;

developing a relationship between detector modulation transfer function of arbitrary shaped detectors and Fraunhofer diffraction patterns of arbitrary shape apertures of the same shape as said arbitrary shaped detectors; and determining the modulation out from said arbitrary shaped detectors when irradiated by said radiation E.

2. An analog computer and mathematical analytical method for determining detector modulation transfer function of an arbitrary shaped detector scanned in an arbitrary in-scan direction, the steps of said method comprising:

providing an apparatus for which Fraunhofer diffraction patterns of irradiance are produced on an observing plane by passing radiation from a light source through an arbitrary shaped aperture on an opaque sheet parallel with said observing plane in which said aperture is made the same shape as a detector whose modulation transfer function is to be determined;

establishing a thermal imager scan direction x-axis through said aperture on said opaque sheet and further establishing a thermal imager scan direction x'-axis on said observing plane parallel with said x-axis and passing through the center of symmetry of Fraunhofer diffraction pattern on said opaque sheet;

moving a sensor means along said x'-axis on said observing plane wherein said sensor means responds linearly to the irradiance incident upon said observing plane along said x'-axis;

digitizing the Fraunhofer diffraction irradiance pattern and producing a voltage from said sensor means as a function of position along said x'-axis;

plotting the square root of said voltage versus distance along said x'-axis normalized so that at a point along said line of symmetry in which x'=0 the square root of said voltage is 1; and relabeling the plot of the square root of said voltage along a vertical axis with the modulation transfer function label and the distance x'-axis with a spatial frequency $f_x$.

3. A method as set forth in claim 2 wherein said step of establishing thermal imager scan direction x-axis is by establishing said x-axis in any arbitrary direction whereupon determining detector modulation transfer function is found in any direction across said arbitrary shaped detector.

4. A method as set forth in claim 3 wherein said sensor means is a photo-voltaic detector.

5. A method as set forth in claim 3 wherein an optical means exists between said light source and said opaque sheet for collimating said radiation on said aperture.

6. A method as set forth in claim 5 wherein a converging lens exists between said opaque sheet and said observing plane for shortening the distance between said sheet and said plane.

7. A method as set forth in claim 2 further comprising the step of providing Fraunhofer diffraction intensity pattern formulae calculating in the x'- and y'-axes for each of a plurality of specific aperture shapes for the step of plotting the square root of said voltages versus distance instead of the digitized Fraunhofer diffraction irradiance pattern from said sensor means as the input for the plotting step.

8. A method as set forth in claim 7 wherein the step of providing Fraunhofer diffraction intensity pattern formulae is by providing an analytical algorithm for converting said Fraunhofer diffraction intensity pattern formulae into equations needed in going from spatial coordinates, wavelength of a radiation source, and the distance of the aperture plane at the aperture on said opaque sheet to the Fraunhofer plane at the observing plane and the angle $\theta$ for the in-scan pattern to the spatial frequency of the detector modulation transfer function.

* * * * *